United States Patent
Han et al.

(10) Patent No.: US 10,454,134 B2
(45) Date of Patent: *Oct. 22, 2019

(54) LITHIUM SECONDARY BATTERY

(71) Applicant: SK Innovation Co., Ltd., Seoul (KR)

(72) Inventors: Kook-Hyun Han, Daejeon (KR);
Kyung-Bin Yoo, Daejeon (KR);
Duck-Chul Hwang, Suwon-si (KR)

(73) Assignee: SK Innovation Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/232,111

(22) Filed: Aug. 9, 2016

(65) Prior Publication Data

US 2017/0047609 A1    Feb. 16, 2017

(30) Foreign Application Priority Data

Aug. 10, 2015 (KR) .......................... 10-2015-0112467

(51) Int. Cl.
| | | |
|---|---|---|
| *H01M 10/0525* | (2010.01) | |
| *H01M 4/131* | (2010.01) | |
| *H01M 4/485* | (2010.01) | |
| *H01M 2/16* | (2006.01) | |
| *H01M 4/36* | (2006.01) | |
| *H01M 4/505* | (2010.01) | |

(Continued)

(52) U.S. Cl.
CPC ..... *H01M 10/0525* (2013.01); *H01M 2/1686* (2013.01); *H01M 4/131* (2013.01); *H01M 4/366* (2013.01); *H01M 4/485* (2013.01); *H01M 4/505* (2013.01); *H01M 4/525* (2013.01); *H01M 10/4235* (2013.01); *H01M 2004/021* (2013.01)

(58) Field of Classification Search
CPC ...... H01M 4/131; H01M 4/485; H01M 4/505; H01M 4/525; H01M 4/1391; H01M 10/052; H01M 10/0525
See application file for complete search history.

(56) References Cited

U.S. PATENT DOCUMENTS

| | | | |
|---|---|---|---|
| 2007/0254209 A1* | 11/2007 | Baba ....................... | H01M 2/14 429/129 |
| 2009/0068561 A1* | 3/2009 | Sun ........................ | H01M 4/131 429/223 |

(Continued)

FOREIGN PATENT DOCUMENTS

| | | |
|---|---|---|
| KR | 1020060134631 A | 12/2006 |
| KR | 1020140118517 A | 10/2014 |

(Continued)

*Primary Examiner* — Jimmy Vo
(74) *Attorney, Agent, or Firm* — IP & T Group LLP (57) ABSTRACT

A lithium secondary battery including a cathode electrode, an anode electrode, and a separation film installed between the cathode electrode and the anode electrode, wherein the cathode electrode includes a cathode active material containing lithium-metal oxide of which at least one of metals has a continuous concentration gradient region between a core part and a surface part thereof, the anode electrode includes a ceramic coating layer on at least one surface thereof, and the separation film includes a base film, and a ceramic coating layer formed on at least one surface of the base film, such that it is possible to achieve a significantly improved effect in both of the lifespan property and penetration durability.

17 Claims, 3 Drawing Sheets

(51) Int. Cl.
*H01M 4/525* (2010.01)
*H01M 10/42* (2006.01)
*H01M 4/02* (2006.01)

(56) References Cited

U.S. PATENT DOCUMENTS

| | | |
|---|---|---|
| 2010/0015514 A1 | 1/2010 | Miyagi et al. |
| 2011/0052980 A1 | 3/2011 | Sakata et al. |
| 2011/0262796 A1* | 10/2011 | Shimooka ............ H01M 2/1653 429/144 |
| 2013/0260231 A1 | 10/2013 | Hua et al. |
| 2014/0027670 A1* | 1/2014 | Sun ....................... H01M 4/483 252/182.1 |
| 2014/0087266 A1 | 3/2014 | Li et al. |
| 2014/0158932 A1 | 6/2014 | Sun et al. |

FOREIGN PATENT DOCUMENTS

| | | | |
|---|---|---|---|
| WO | 2012093797 A2 | 7/2012 | |
| WO | WO-2012093797 A2 * | 7/2012 | ............ H01M 4/364 |
| WO | 2013183974 A1 | 12/2013 | |

\* cited by examiner

LITHIUM SECONDARY BATTERY

CROSS-REFERENCE TO RELATED APPLICATION

This application claims priority to Korean Patent Application No. 10-2015-0112467 filed Aug. 10, 2015, the disclosure of which is hereby incorporated in its entirety by reference.

BACKGROUND OF THE INVENTION

1. Field of the Invention

The present invention relates to a lithium secondary battery, and more specifically, to a lithium secondary battery which has excellent life span property and penetration safety.

2. Description of the Related Art

With rapid progress of electronic, telecommunication and computer industries, portable electronic communication devices such as a camcorder, mobile phone, notebook PC, etc. have been remarkably developed. Accordingly, the demand for a lithium secondary battery as a power source capable of driving the above device is also increased. In particular, with regard to applications of eco-friendly power sources such as an electric car, uninterruptible power supply, electromotive tool and satellite, research and development have been actively proceeded in domestic field and other countries such as Japan, Europe, United States, etc.

Among currently used secondary batteries, the lithium secondary battery developed since early 1990's includes an anode electrode made of a carbon material capable of absorbing and desorbing lithium ions, a cathode electrode made of lithium-containing oxide, and a non-aqueous electrolyte containing lithium salt dissolved in a mixed organic solvent in a suitable amount.

In this regard, as the application of the lithium secondary battery is more enlarged, a case that the lithium secondary battery should be used even under more severe environments is increased.

However, lithium transition metal oxide or composite oxide used as a cathode active material of the lithium secondary battery entails a problem that a metal component is desorbed from the cathode electrode during storage at a high temperature under fully charged condition, hence being in thermally unstable state. In addition, when a forced internal short circuit occurs due to an external impact, a heating value inside the battery is rapidly increased, thereby causing ignition.

In order to solve the above problems, Korean Patent Laid-Open Publication No. 2006-0134631 discloses a cathode active material having a core-shell structure in which a core part and a shell part are made of lithium transition metal oxides different from each other, however, still has lack of improvement in life-span property and safety of the battery.

SUMMARY OF THE INVENTION

Accordingly, it is an object of the present invention to provide a lithium secondary battery which has excellent life-span property and penetration safety.

In order to achieve the above object, according to one aspect of the present invention, there is provided a lithium secondary battery, including a cathode electrode, an anode electrode, and a separation film installed between the cathode electrode and the anode electrode, wherein the cathode electrode includes a cathode active material containing lithium-metal oxide of which at least one of metals has a continuous concentration gradient region between a core part and a surface part thereof, the anode electrode includes a ceramic coating layer on at least one surface thereof, and the separation film includes a base film, and a ceramic coating layer formed on at least one surface of the base film.

In the lithium secondary battery according to one embodiment of the present invention, another of the metals included in the lithium-metal oxide may have a constant concentration between the core part and the surface part.

In the lithium secondary battery according to one embodiment of the present invention, the lithium-metal oxide may include a first metal having a concentration gradient region with increased concentration between the core part and the surface part, and a second metal having a concentration gradient region with decreased concentration between the core part and the surface part.

In the lithium secondary battery according to one embodiment of the present invention, the lithium-metal oxide may be represented by Formula 1 below, and at least one of M1, M2 and M3 may have a continuous concentration gradient between the core part and the surface part:

$$Li_xM1_aM2_bM3_cO_y \quad \text{[Formula 1]}$$

(wherein M1, M2 and M3 are selected from a group consisting of Ni, Co, Mn, Na, Mg, Ca, Ti, V, Cr, Cu, Zn, Ge, Sr, Ag, Ba, Zr, Nb, Mo, Al, Ga and B, and
0<x≤1.1, 2≤y≤2.02, 0≤a≤1, 0≤b≤1, 0≤c≤1, and 0<a+b+c≤1).

In the lithium secondary battery according to one embodiment of the present invention, at least one of the M1, M2 and M3 may have a concentration gradient region with increased concentration between the core part and the surface part, while the others may have a concentration gradient region with decreased concentration between the core part and the surface part.

In the lithium secondary battery according to one embodiment of the present invention, at least one of the M1, M2 and M3 may have a concentration gradient region with increased concentration between the core part and the surface part, another may have a concentration gradient region with decreased concentration between the core part and the surface part, and the other may have a constant concentration between the core part and the surface part.

In the lithium secondary battery according to one embodiment of the present invention, the M1, M2 and M3 may be Ni, Co and Mn, respectively.

In the lithium secondary battery according to one embodiment of the present invention, the M1 may be Ni, and 0.6≤a≤0.95 and 0.05≤b+c≤0.4.

In the lithium secondary battery according to one embodiment of the present invention, the M1 may be Ni, and 0.7≤a≤0.9 and 0.1≤b+c≤0.3.

In the lithium secondary battery according to one embodiment of the present invention, the ceramic coating layer of the anode electrode may include ceramic powders having an average particle diameter of 0.01 to 2.0 μm.

In the lithium secondary battery according to one embodiment of the present invention, the ceramic coating layer of the anode electrode may include the ceramic powders in an amount of 80 to 97% by weight to a total weight of the ceramic coating layer.

In the lithium secondary battery according to one embodiment of the present invention, the ceramic coating layer of the separation film may include ceramic powders having an average particle diameter of 0.01 to 2.0 μm.

In the lithium secondary battery according to one embodiment of the present invention, the ceramic coating layer of the separation film may include the ceramic powders in an amount of 80 to 97% by weight to a total weight of the ceramic coating layer.

In the lithium secondary battery according to one embodiment of the present invention, the ceramic coating layers of the anode electrode and the separation film may include each independently metal oxide containing at least one metal selected from a group consisting of aluminum (Al), titanium (Ti), zirconium (Zr), barium (Ba), magnesium (Mg), boron (B), yttrium (Y), zinc (Zn), calcium (Ca), nickel (Ni), silicon (Si), lead (Pb), strontium (Sr), tin (Sn) and cerium (Ce), as the ceramic powders.

In the lithium secondary battery according to one embodiment of the present invention, the ceramic coating layers of the anode electrode and the separation film may include each independently at least one selected from a group consisting of $Al_2O_3$, $TiO_2$, $ZrO_2$, $Y_2O_3$, ZnO, CaO, NiO, MgO, $SiO_2$, SiC, $Al(OH)_3$, AlO(OH), $BaTiO_3$, $PbTiO_3$, PZT, PLZT, PMN-PT, $HfO_2$, $SrTiO_3$, $SnO_3$ and $CeO_2$, as the ceramic powders.

In the lithium secondary battery according to one embodiment of the present invention, the ceramic coating layer included on one surface of the anode electrode may have a thickness of 1 to 10 μm.

In the lithium secondary battery according to one embodiment of the present invention, the ceramic coating layer included on one surface of the separation film may have a thickness of 1 to 10 μm.

In the lithium secondary battery according to one embodiment of the present invention, the ceramic coating layers of the anode electrode and the separation film may have a sum of total thickness of 5 to 30 μm.

The lithium secondary battery according to the present invention includes a combination of the cathode active material containing the metal having the continuous concentration gradient, and the anode electrode and the separation film respectively including the ceramic coating layer formed thereon, such that it is possible to achieve a significantly improved effect in both of the lifespan property and penetration durability.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE INVENTION

The present invention discloses a lithium secondary battery including a cathode electrode, an anode electrode, and a separation film installed between the cathode electrode and the anode electrode, wherein the cathode electrode includes a cathode active material containing lithium-metal oxide of which at least one of metals has a continuous concentration gradient region between a core part and a surface part thereof, the anode electrode includes a ceramic coating layer on at least one surface thereof, and the separation film includes a base film, and a ceramic coating layer formed on at least one surface of the base film, such that it is possible to achieve a significantly improved effect in both of the lifespan property and penetration durability.

Hereinafter, the present invention will be described in more detail.

The present invention relates to a lithium secondary battery including a cathode electrode, an anode electrode, and a separation film installed between the cathode electrode and the anode electrode.

Cathode Electrode

The cathode electrode according to the present invention includes the cathode active material containing lithium-metal oxide which has a specific concentration gradient.

The cathode active material used in the present invention includes lithium-metal oxide of which at least one of metals has a continuous concentration gradient between a core part and a surface part thereof. Such a cathode active material exhibits superior life-span property, compared to a cathode active material without a change in concentration.

In the present invention, the fact that the metal of the lithium-metal oxide has a continuous concentration gradient region between the core part and the surface part, means that other metals except for lithium may have a concentration distribution region varying in a constant tendency between a core part and a surface part of a lithium-metal oxide particle. The constant tendency means that a development of the entire concentration change is decreased or increased, however, does not exclude that a value opposed to the above tendency may be represent at a position.

In the present invention, the core part of the particle means an area within 0.2 μm radius from a center of the active material particle, while the surface part means an area within 0.2 μm from the outmost portion of the particle.

The cathode active material according to the present invention may include at least one of metals having a concentration gradient. Therefore, as one embodiment, the cathode active material may include a first metal having a concentration gradient region with increased concentration between the core part and the surface part, and a second metal having a concentration gradient region with decreased concentration between the core part and the surface part. The first metal or second metal may be independently at least one of metals.

As another embodiment of the present invention, the cathode active material according to the present invention may include a metal having a constant concentration between the core part and the surface part, among the metals forming the lithium-metal oxide.

A specific example of the cathode active material according to the present invention may include lithium-metal oxide represented by Formula 1 below, wherein at least one of M1, M2 and M3 has a continuous concentration gradient between the core part and the surface part:

[Formula 1]

(wherein M1, M2 and M3 are selected from a group consisting of Ni, Co, Mn, Na, Mg, Ca, Ti, V. Cr, Cu, Zn, Ge, Sr, Ag, Ba, Zr, Nb, Mo, Al, Ga and B, and 0<x≤1.1, 2≤y≤2.02, 0≤a≤1, 0≤b≤1, 0≤c≤1, and 0<a+b+c≤1).

According to one embodiment of the present invention, at least one of M1, M2 and M3 may have a concentration gradient region with increased concentration between the core part and the surface part, while the others may have a concentration gradient region with decreased concentration between the core part and the surface part.

According to another embodiment of the present invention, at least one of M1, M2 and M3 may have a concentration gradient region with increased concentration between the core part and the surface part, another may have a concentration gradient region with decreased concentration between the core part and the surface part, and the other may have a constant concentration between the core part and the surface part.

As a specific example of the present invention, M1, M2 and M3 may be Ni, Co and Mn, respectively.

The lithium-metal oxide according to the present invention may have a relatively higher content of nickel (Ni). Using Ni may be helpful for improving a capacity of the battery. For a structure of the conventional cathode active material, if a content of Ni is high, life-span is reduced. However, in a case of the cathode active material according to the present invention, the life-span property is not deteriorated even if it has a high content of Ni. Therefore, the cathode active material of the present invention may exhibit excellent life-span property while maintaining a high capacity.

For example, with regard to the lithium-metal oxide according to the present invention, a molar ratio of Ni may range from 0.6 to 0.95, and preferably, 0.7 to 0.9. That is, if M1 is Ni in the above Formula 1, it may be $0.6 \leq a \leq 0.95$ and $0.05 \leq b+c \leq 0.4$, and preferably, $0.7 \leq a \leq 0.9$ and $0.1 \leq b+c \leq 0.3$.

A particle shape of the lithium-metal oxide according to the present invention is not particularly limited, but a first particle thereof preferably has a rod-type shape.

A particle size of the lithium-metal oxide according to the present invention is not particularly limited, and may be a range of 3 to 20 μm, for example.

The cathode active material according to the present invention may further include a coating layer on the above-described lithium-metal oxide. The coating layer may be made of a metal or metal oxide including, for example, Al, Ti, Ba, Zr, Si, B, Mg and P, and alloys thereof or oxides of the above metal.

As necessary, the cathode active material according to the present invention may include a configuration in which the above-described lithium-metal oxide is doped with metals or metal oxides. Such a doping metal may include, for example, Al, Ti, Ba, Zr, Si, B, Mg and P, and alloys thereof or oxides of the above metal.

The lithium-metal oxide according to the present invention may be prepared by co-precipitation.

Hereinafter, a method for preparing a cathode active material according to one embodiment of the present invention will be described.

First, metal precursor solutions having different concentrations from each other are prepared. The metal precursor solution is a solution containing a precursor of at least one metal to be contained in the cathode active material. For example, the metal precursor may generally include halides, hydroxides, acid salts of metal, or the like.

To fabricate the metal precursor solution, a precursor solution having a concentration corresponding to constitutional compositions of the center part of the cathode active material and a precursor solution having a concentration corresponding to constitutional compositions of the surface part of the cathode active material are respectively prepared, to obtain two precursor solutions. For example, when fabricating a cathode active material of metal oxide containing nickel, manganese and cobalt other than lithium, a precursor solution having a concentration of nickel, manganese and cobalt corresponding to the constitutional compositions of the center part of the cathode active material and a precursor solution having a concentration of nickel, manganese and cobalt corresponding to the constitutional compositions of the surface part of the cathode active material are respectively prepared.

Next, the prepared two metal precursor solutions are mixed to form a precipitate. During mixing the above solutions, a mixing ratio of the two metal precursor solutions is continuously changed so as to correspond to the concentration gradient in a required active material. Accordingly, the precipitate has a concentration of metal corresponding to the concentration gradient in the active material. In this case, precipitation may be performed by adding a chelating agent and bases during mixing the above solutions.

After the prepared precipitate is subjected to heat treatment, if it is mixed with a lithium salt and the mixture is again subjected to heat treatment, a cathode active material according to the present invention may be obtained.

The cathode electrode according to the present invention may be formed by adding a solvent and, optionally, a binder, conductive material, dispersant, etc. to the cathode active material, and agitating the same to prepare a cathode slurry, then applying (coating) the slurry to a collector made of a metal material, and drying and pressing the same.

The binder may include any one commonly used in the related art without particular limitation thereof. For example, an organic binder such as polyvinylidene fluoride-hexafluoropropylene copolymer (PVDF-co-HFP), polyvinylidene fluoride (PVDF), polyacrylonitrile, polymethyl methacrylate, etc.; or an aqueous binder such as styrene-butadiene rubber (SBR), etc., may be used together with a thickener such as carboxymethyl cellulose (CMC).

The conductive material may include any conductive carbon substance generally used in the related art without particular limitation thereof.

The collector made of a metal material is a metal having high conductivity and being easily attached with the slurry of the cathode electrode or anode active material. The metal used herein may include any one if it does not have reactivity in the voltage range of the battery. As non-limited examples, the cathode electrode collector may include aluminum, nickel, or a foil made of a combination thereof. As the non-limited examples, the anode electrode collector may include copper, gold, nickel or a copper alloy, or a foil made of a combination thereof.

Anode Electrode

The anode electrode according to the present invention may include a ceramic coating layer on at least one surface thereof, and preferably, the ceramic coating layers are included on opposite surfaces thereof.

In the secondary battery according to the present invention, due to an interaction between the cathode electrode including the cathode active material having a specific concentration configuration, the anode electrode including the ceramic coating layer, and the separation film including a ceramic coating layer to be described below, it is possible to significantly improve life-span property of the battery, and also significantly improve safety for the penetration evaluation. In regard of the penetration evaluation, if an external impact is applied to the secondary battery, an internal short circuit occurs and a heating value inside the battery is rapidly increased. If the heating value is rapidly increased, the separation film inside the battery may be contracted, and two electrodes of cathode and anode are exposed to an outside to cause a short circuit between the electrodes, and thereby become more likely to be additionally ignited and exploded.

On the other hand, the secondary battery according to the present invention uses the anode electrode coated with ceramic through the above-described configuration, such that, even if the separation film is contracted according to the heating value during the evaluation of penetration, the ceramic coating layer of the anode electrode still remains. Therefore, the short circuit between the electrodes may be prevented, so as to significantly improve the safety (safety in penetration evaluation).

The anode electrode according to the present invention is formed by applying an anode active material thereto. In this case, first, the anode active material may be applied to a copper substrate, followed by drying and pressing the same, and then, a ceramic coating solution containing the ceramic powders may be applied to at least one surface of the anode electrode and dried, to form the ceramic coating layer thereon.

The ceramic powders useable in the ceramic coating layer of the anode electrode according to the present invention may have an average particle diameter of 0.01 to 2.0 µm, and preferably, 0.3 to 1.5 µm. Within the above range, dispersion characteristics may be suitably maintained.

The ceramic powders included in the ceramic coating layer of the anode electrode may be oxides containing at least one metal selected from a group consisting of aluminum (Al), titanium (Ti), zirconium (Zr), barium (Ba), magnesium (Mg), boron (B), yttrium (Y), zinc (Zn), calcium (Ca), nickel (Ni), silicon (Si), lead (Pb), strontium (Sr), tin (Sn) and cerium (Ce). Specifically, the metal oxide of the ceramic powders may include at least one selected from a group consisting of $Al_2O_3$, $TiO_2$, $ZrO_2$, $Y_2O_3$, ZnO, CaO, NiO, MgO, $SiO_2$, SiC, $Al(OH)_3$, AlO(OH), $BaTiO_3$, $PbTiO_3$, PZT, PLZT, PMN-PT, $HfO_2$, $SrTiO_3$, $SnO_3$ and $CeO_2$, but it is not limited thereto. These oxides may be used alone or in combination of two or more thereof.

The ceramic powders included in the ceramic coating layer of the anode electrode may be included in an amount of 80 to 97% by weight ('wt. %') to a total weight of the ceramic coating layer, and preferably 85 to 95 wt. %.

The ceramic coating composition of the anode electrode according to the present invention may include a binder resin, a solvent, other additives, etc. other than the ceramic powders.

Preferably, the binder resin useable in the present invention may include polyvinylidenefluoride-co-hexafluoropropylene, polyvinylidene fluorideco-trichloroethylene, polymethylmethacrylate, polyacrylonitrile, polyvinylpyrrolidone, polyvinylacetate, polyethylene-co-vinyl acetate, polyimide, polyethylene oxide, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, polyvinylalcohol, or the like, but it is not limited thereto.

The solvent useable in the present invention may include at least one selected from tetrachloroethane, methylene chloride, chloroform, 1,1,2-trichloroethane, tetrahydrofuran, 1,4-dioxane, cyclohexanone, dimethylformamide, dimethylacetamide, dimethylsulfoxide, N-methyl-2-pyrrolidone, but it is not limited thereto.

A method of forming the ceramic coating layer according to the present invention is not particularly limited but may use various methods such as, for example, dip coating, die coating, roll coating, comma coating, or a mixed method thereof.

A thickness of the ceramic coating layer of the anode electrode according to the present invention is not particularly limited but may be 1 to 10 µm, and preferably, 3 to 7 µm. Within the above range, even if the separation film is contracted, it is possible to block the electrodes so as to prevent an occurrence of the short circuit therebetween, thereby the penetration safety of the battery may be more improved.

In addition, the ceramic coating layer of the anode electrode according to the present invention may be formed on at least one surface of the anode electrode. When the ceramic coating layers are formed on opposite surfaces of the anode electrode, the ceramic coating layers may have a sum of total thickness of 2 to 20 µm. Within the above range, the penetration safety of the battery may be more improved, and preferably, the ceramic coating layers are formed on the opposite surfaces.

The anode active material according to the present invention may include any material generally used in the related art without particular limitation thereof.

The anode active material useable in the present invention may include any material known in the related art, so long as it can absorb and desorb lithium ions, without particular limitation thereof. For example, carbon materials such as crystalline carbon, amorphous carbon, carbon composite, carbon fiber, etc., lithium metal, alloys of lithium and other elements, silicon, or tin may be used. The amorphous carbon may include, for example, hard carbon, cokes, mesocarbon microbead (MCMB) calcined at a temperature of 1500° C. or less, mesophase pitch-based carbon fiber (MPCF), or the like. The crystalline carbon may include graphite materials, and specifically, natural graphite, graphite cokes, graphite MCMB, graphite MPCF, or the like. Other elements used together with lithium to form an alloy thereof may include, for example, aluminum, zinc, bismuth, cadmium, antimony, silicone, lead, tin, gallium or indium.

A size of the graphite used in the present invention is not particularly limited, but the graphite may have an average particle diameter of 5 to 30 µm.

The anode electrode according to the present invention may be formed by adding a solvent and, optionally, a binder, conductive material, dispersant, etc. to the above-described anode active material, and agitating the same to prepare an anode slurry, then applying (coating) the slurry to a collector made of a metal material, and drying and pressing the same. In this case, the solvent, binder, conductive material, dispersant, etc. may use the same material as the above-described cathode electrode, and may apply the same forming method as thereof.

Separation Film

The separation film according to the present invention is installed between the cathode electrode and the anode electrode to play a role of insulating the same from each other, and may include a ceramic coating layer on at least one surface thereof.

In the secondary battery according to the present invention, due to an interaction between the cathode electrode including the cathode active material having a specific concentration configuration, the anode electrode including the ceramic coating layer, it is possible to significantly improve life-span property of the battery, and also significantly improve safety for the penetration evaluation.

The separation film according to the present invention may include a base film, and a ceramic coating layer formed by applying a ceramic coating composition containing ceramic powders to at least one surface of the base film.

The base film useable in the present invention may include a conventional porous polymer film, for example, a porous polymer film made of a polyolefin polymer such as ethylene homopolymer, propylene homopolymer, ethylene/butene copolymer, ethylene/hexene copolymer or ethylene/methacrylate copolymer, which may be used alone or as a laminate formed by stacking up the same. Otherwise, conventional porous woven fabrics, for example, a woven fabric made of high-melting point glass fiber, polyethylene terephthalate fiber, etc., may be used, but it is not particularly limited thereto. The base film may be applied to a battery by any general method such as winding. Besides, lamination (stacking) and folding of a separator and the electrodes may also be used.

The material used in the ceramic coating layer of the separation film according to the present invention may use the same material as the above-described anode electrode, and may apply the same forming method as thereof.

The ceramic powders useable in the ceramic coating layer of the separation film according to the present invention may have an average particle diameter of 0.01 to 2.0 μm, preferably, 0.3 to 1.5 μm. Within the above range, dispersion characteristics may be suitably maintained.

The ceramic powders included in the ceramic coating layer of the separation film may be included in an amount of 80 to 97 wt. % to a total weight of the ceramic coating layer, and preferably 85 to 95 wt. %.

A thickness of the ceramic coating layer coated on any one surface of the base film according to the present invention is not particularly limited but may be 1 to 10 μm, and preferably, 1 to 7 μm. Within the above range, it is possible to prevent the separation film from being contracted during penetrating the ceramic coating layer, thereby the penetration safety of the battery may be more improved, and a rapid decrease in life span may be effectively suppressed.

In addition, the ceramic coating layer according to the present invention may be formed on at least one surface of the base film. When the ceramic coating layers are formed on opposite surfaces of the base film, the ceramic coating layers may have a sum of total thickness of 2 to 20 μm.

When reviewing the structure of the secondary battery according to the present invention, the secondary battery may have a structure in which [ceramic coating layer/anode electrode/ceramic coating layer], [ceramic coating layer/separation film/ceramic coating layer], and [cathode electrode] are sequentially laminated.

The secondary battery may further include a non-aqueous electrolyte, and the non-aqueous electrolyte may include lithium salt which is an electrolyte and an organic solvent. The lithium salt may include any one typically used for a lithium secondary battery electrolyte without particular limitation thereof. Representative examples of the organic solvent may include any one selected from a group consisting of propylene carbonate (PC), ethylene carbonate (EC), diethyl carbonate (DEC), dimethyl carbonate (DMC), ethylmethyl carbonate (EMC), methylpropyl carbonate, dipropyl carbonate, dimethyl sulfoxide, acetonitrile, dimethoxyethane, diethoxyethane, vinylene carbonate, sulforane, γ-butyrolactone, propylene sulfite, and tetrahydrofurane, or a mixture of two or more thereof.

The non-aqueous electrolyte may be introduced into an electrode structure including a cathode electrode, an anode electrode, and a separation film installed between the cathode electrode and the anode electrode, so as to fabricate a lithium secondary battery.

An appearance of the lithium secondary battery of the present invention is not particularly limited, but may include, for example, a cylindrical or square form using a can, a pouch type or a coin type.

Hereinafter, preferred embodiments are proposed to more concretely describe the present invention. However, the following examples are only given for illustrating the present invention and those skilled in the related art will obviously understand that various alterations and modifications are possible within the scope and spirit of the present invention. Such alterations and modifications are duly included in the appended claims.

EXAMPLE 1

<Cathode Electrode>

Lithium-metal oxide (hereinafter, FCG) with a whole composition of $LiNi_{0.77}Co_{1.22}Mn_{0.11}O_2$, a core part composition of $LiNi_{0.81}Co_{0.13}Mn_{0.05}O_2$ and a surface part composition of $LiNi_{0.75}Co_{0.12}Mn_{0.13}O_2$, having a concentration gradient between the core part and the surface part as a cathode active material, Denka Black as a conductive material, and PVDF as a binder were used in a weight ratio of 92:5:3, respectively, to prepare a cathode electrode slurry. Thereafter, the slurry was applied to an aluminum substrate to coat the same, followed by drying and pressing to prepare a cathode electrode.

Figure 1:
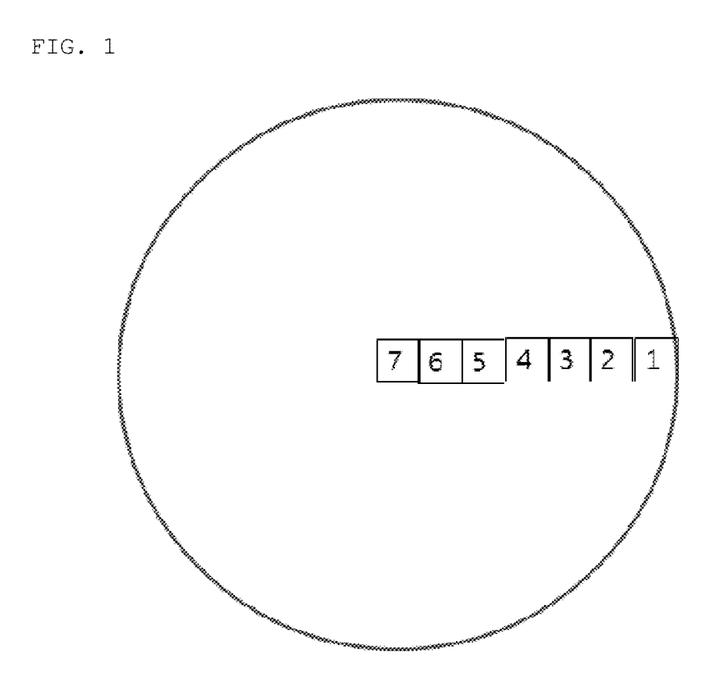
FIG. 1 is a view schematically illustrating a site of measuring a concentration of metal elements included in lithium-metal oxide according to an embodiment of the present invention.
Figure 2:
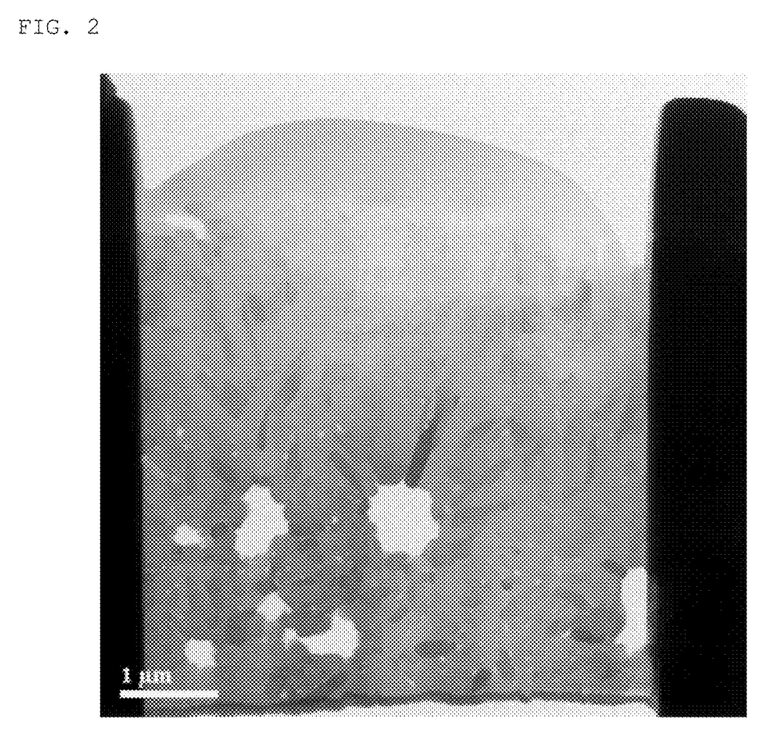
FIG. 2 is a photograph illustrating a cross section of a lithium-metal oxide of Example 1.
Figure 3:
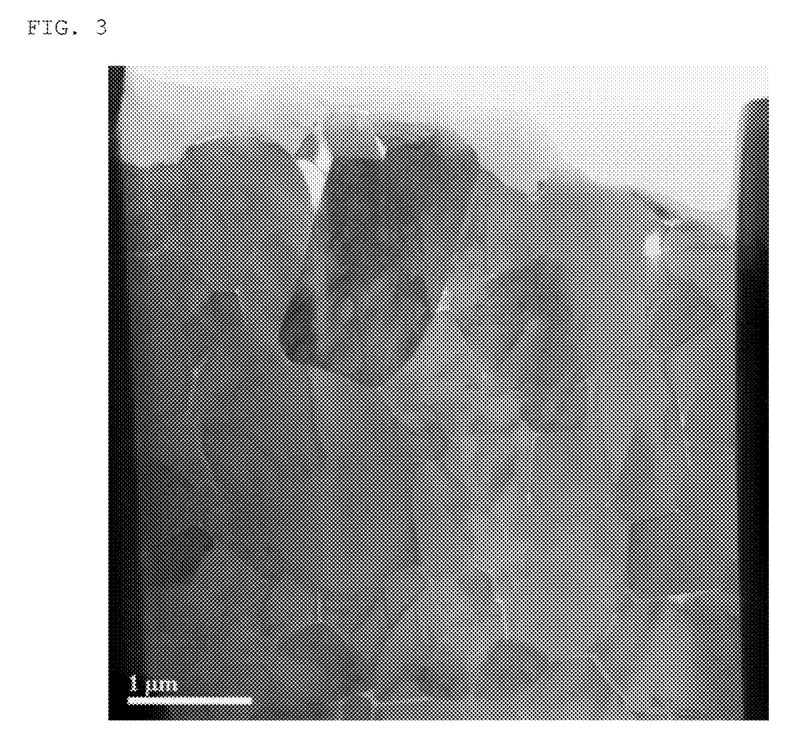
FIG. 3 is a photograph illustrating a cross section of a lithium-metal oxide of Comparative Example 1.

For reference, the concentration gradient of the prepared lithium-metal oxide is listed in Table 1 below, and a measurement site of concentration is shown in FIG. 1. For the lithium-metal oxide particle with a distance between a core of a particle to the surface thereof, that is, 5 μm, the measurement sites were present at an interval of 5/7 μm from the surface.

TABLE 1

| Site | Ni | Mn | Co |
|---|---|---|---|
| 1 | 74.97 | 12.46 | 12.57 |
| 2 | 77.98 | 9.79 | 12.23 |
| 3 | 79.68 | 7.5 | 12.82 |
| 4 | 79.60 | 7.9 | 12.5 |
| 5 | 79.55 | 7.57 | 12.87 |
| 6 | 80.24 | 6.4 | 13.36 |
| 7 | 81.33 | 5.34 | 13.33 |

<Anode Electrode>

An anode electrode slurry including 92 wt. % of natural graphite as an anode active material, 5 wt. % of a flake type conductive material, that is, KS6 as a conductive material, 1 wt. % of SBR as a binder, and 1 wt. % of CMC as a thickener was applied to a copper substrate, followed by drying and pressing to prepare an anode active material layer. Then, ceramic coating layers (B-1) including boehmite (AlO(OH)) and an acrylate binder in a weight ratio of 90:10 were respectively formed on upper and lower surfaces of the prepared anode active material, so as to reach a thickness of 1 μm.

<Separation Film>

Ceramic coating layers (A-1) including boehmite (AlO(OH)) and an acrylate binder in a weight ratio of 90:10 were respectively formed on upper and lower surfaces of polyethylene fabric having a thickness of 16 μm, so as to reach a thickness of 1 μm.

<Battery>

By notching both of a cathode electrode and an anode electrode in a suitable size, respectively, laminating the same, and installing a separation film between the cathode electrode and the anode electrode, a cell was fabricated. Tap parts of the cathode electrode and the anode electrode were welded, respectively. A combination of the welded cathode electrode/separation film/anode electrode was put into a pouch, followed by sealing three sides of the pouch except one side into which an electrolyte is injected. In this case, a portion having the tap is included in the sealing portion. After injecting the electrolyte through the remaining one side, the one side was also sealed, followed by impregnation for 12 hours or more. The electrolyte used herein was formed by preparing 1M $LiPF_6$ solution with a mixed solvent of EC/EMC/DEC (25/45/30; volume ratio), and adding 1 wt. % of vinylene carbonate (VC), 0.5 wt. % of 1,3-propene sultone (PRS), and 0.5 wt. % of lithium bis(oxalato)borate (LiBOB) thereto.

After then, pre-charging was conducted with a current (2.5 A) corresponding to 0.25 C for 36 minutes. After 1 hour, degassing and then aging were conducted for 24 hours or more, followed by chemical charging-discharging (charge condition: CC-CV 0.2 C 4.2 V 0.05 C CUT-OFF; discharge condition: CC 0.2 C 2.5 V CUT-OFF). Thereafter, standard charging-discharging was conducted (charge condition: CC-CV 0.5 C 4.2 V 0.05 C CUT-OFF; discharge condition: CC 0.5 C 2.5 V CUT-OFF).

Comparative Example 1

The same procedures as described in Example 1 were conducted to fabricate a cell except that $LiNi_{0.8}Co_{0.1}Mn_{0.1}O_2$ (hereinafter, NCM811) having a uniform composition throughout particles was used as a cathode active material, to prepare a battery.

Examples 2 to 26 and Comparative Examples 2 to 6 The same procedures as described in Example 1 were conducted to prepare batteries, except that the batteries have compositions and thicknesses in a range listed in Table 2 below (the anode electrodes were also formed on the opposite surfaces of the copper substrate).

TABLE 2

| Section | Cathode active material (composition) | Separation film | | | Ceramic coating layer on one surface of anode electrode (composition/thickness μm) |
|---|---|---|---|---|---|
| | | Upper ceramic coating layer (composition/thickness μm) | Base film (composition/thickness μm) | Lower ceramic coating layer (composition/thickness μm) | |
| Example 1 | FCG | A-1/1 | PE/16 | A-1/1 | B-1/3 |
| Example 2 | FCG | A-1/1 | PE/16 | A-1/1 | B-1/5 |
| Example 3 | FCG | A-1/1 | PE/16 | A-1/1 | B-1/7 |
| Example 4 | FCG | A-1/1 | PE/16 | A-1/1 | B-1/10 |
| Example 5 | FCG | A-1/2 | PE/16 | A-1/2 | B-1/3 |
| Example 6 | FCG | A-1/2 | PE/16 | A-1/2 | B-1/5 |
| Example 7 | FCG | A-1/2 | PE/16 | A-1/2 | B-1/7 |
| Example 8 | FCG | A-1/2 | PE/16 | A-1/2 | B-1/10 |
| Example 9 | FCG | A-1/3 | PE/16 | A-1/3 | B-1/3 |
| Example 10 | FCG | A-1/3 | PE/16 | A-1/3 | B-1/5 |
| Example 11 | FCG | A-1/3 | PE/16 | A-1/3 | B-1/7 |
| Example 12 | FCG | A-1/3 | PE/16 | A-1/3 | B-1/10 |
| Example 13 | FCG | A-1/5 | PE/16 | A-1/5 | B-1/3 |
| Example 14 | FCG | A-1/5 | PE/16 | A-1/5 | B-1/5 |
| Example 15 | FCG | A-1/5 | PE/16 | A-1/5 | B-1/7 |
| Example 16 | FCG | A-1/5 | PE/16 | A-1/5 | B-1/10 |
| Example 17 | FCG | A-1/7 | PE/16 | A-1/7 | B-1/3 |
| Example 18 | FCG | A-1/7 | PE/16 | A-1/7 | B-1/5 |
| Example 19 | FCG | A-1/7 | PE/16 | A-1/7 | B-1/7 |
| Example 20 | FCG | A-1/7 | PE/16 | A-1/7 | B-1/10 |
| Example 21 | FCG | A-1/10 | PE/16 | A-1/10 | B-1/3 |
| Example 22 | FCG | A-1/10 | PE/16 | A-1/10 | B-1/5 |
| Example 23 | FCG | A-1/10 | PE/16 | A-1/10 | B-1/7 |
| Example 24 | FCG | A-1/10 | PE/16 | A-1/10 | B-1/10 |
| Example 25 | FCG | A-2/1 | PE/16 | A-2/1 | B-2/3 |
| Example 26 | FCG | A-3/2 | PE/16 | — | B-3/5 |
| Comparative Example 1 | NCM 811 | A-1/1 | PE/16 | A-1/1 | — |
| Comparative Example 2 | NCM 811 | A-1/1 | PE/16 | A-1/1 | B-1/3 |
| Comparative Example 3 | NCM 811 | A-1/1 | PE/16 | A-1/1 | B-1/5 |
| Comparative Example 4 | NCM 811 | A-1/1 | PE/16 | A-1/1 | B-1/7 |
| Comparative Example 5 | NCM 811 | A-1/1 | PE/16 | A-1/1 | B-1/10 |
| Comparative Example 6 | NCM 811 | A-1/2 | PE/16 | A-1/2 | — |
| Comparative Example 7 | NCM 811 | A-1/2 | PE/16 | A-1/2 | B-1/3 |
| Comparative Example 8 | NCM 811 | A-1/2 | PE/16 | A-1/2 | B-1/5 |
| Comparative Example 9 | NCM 811 | A-1/2 | PE/16 | A-1/2 | B-1/7 |

TABLE 2-continued

| Section | Cathode active material (composition) | Separation film Upper ceramic coating layer (composition/thickness μm) | Base film (composition/thickness μm) | Lower ceramic coating layer (composition/thickness μm) | Ceramic coating layer on one surface of anode electrode (composition/thickness μm) |
|---|---|---|---|---|---|
| Comparative Example 10 | NCM 811 | A-1/2 | PE/16 | A-1/2 | B-1/10 |
| Comparative Example 11 | NCM 811 | A-1/4 | PE/16 | A-1/4 | — |
| Comparative Example 12 | NCM 811 | A-1/4 | PE/16 | A-1/4 | B-1/3 |
| Comparative Example 13 | NCM 811 | A-1/4 | PE/16 | A-1/4 | B-1/5 |
| Comparative Example 14 | NCM 811 | A-1/4 | PE/16 | A-1/4 | B-1/7 |
| Comparative Example 15 | NCM 811 | A-1/4 | PE/16 | A-1/4 | B-1/10 |
| Comparative Example 16 | NCM 811 | A-1/6 | PE/16 | A-1/6 | — |
| Comparative Example 17 | NCM 811 | A-1/6 | PE/16 | A-1/6 | B-1/3 |
| Comparative Example 18 | NCM 811 | A-1/6 | PE/16 | A-1/6 | B-1/5 |
| Comparative Example 19 | NCM 811 | A-1/6 | PE/16 | A-1/6 | B-1/7 |
| Comparative Example 20 | NCM 811 | A-1/6 | PE/16 | A-1/6 | B-1/10 |
| Comparative Example 21 | NCM 811 | A-1/10 | PE/16 | A-1/10 | — |
| Comparative Example 22 | NCM 811 | A-1/10 | PE/16 | A-1/10 | B-1/3 |
| Comparative Example 23 | NCM 811 | A-1/10 | PE/16 | A-1/10 | B-1/5 |
| Comparative Example 24 | NCM 811 | A-1/10 | PE/16 | A-1/10 | B-1/7 |
| Comparative Example 25 | NCM 811 | A-1/10 | PE/16 | A-1/10 | B-1/10 |
| Comparative Example 26 | NCM 811 | A-1/14 | PE/16 | A-1/14 | — |
| Comparative Example 27 | NCM 811 | A-1/14 | PE/16 | A-1/14 | B-1/3 |
| Comparative Example 28 | NCM 811 | A-1/14 | PE/16 | A-1/14 | B-1/5 |
| Comparative Example 29 | NCM 811 | A-1/14 | PE/16 | A-1/14 | B-1/7 |
| Comparative Example 30 | NCM 811 | A-1/14 | PE/16 | A-1/14 | B-1/10 |

A-1: composition (boehmite) for the ceramic coating layer of the separation film of Example 1
A-2: ceramic coating layer using Al(OH)$_3$ instead of boehmite for the ceramic coating layer of the separation film in Example 1
A-3: ceramic coating layer using 93% of boehmite as the ceramic powders of the separation film in Example 1
B-1: composition (boehmite) for the ceramic coating layer of the anode electrode of Example 1
B-2: ceramic coating layer using Al(OH)$_3$ instead of boehmite for the ceramic coating layer of the anode electrode in Example 1
B-3: ceramic coating layer using 93% of boehmite as the ceramic powders of the anode electrode in Example 1

Test Procedure

1. Life-Span Property at Room Temperature

After repeating the charging (CC-CV 2.0 C 4.2 V 0.05 C CUT-OFF) and discharging (CC 2.0 C 2.75 V CUT-OFF) with the cell prepared in each of the examples and comparative examples 500 times, the discharge capacity at 500 times was calculated in % to a discharge capacity at 1 time, thus determining life-span property at room temperature.

Results thereof are shown in Table 3 below.

2. Evaluation of Penetration Safety

The battery prepared in each of the examples and comparative examples was penetrated with a nail from an outside, to confirm whether the battery was ignited or exploded.

Results thereof are shown in Table 3 below.

TABLE 3

| Section | Life-span (%) (500cycle) | Penetration safety |
|---|---|---|
| Example 1 | 83 | Non-ignited |
| Example 2 | 84 | Non-ignited |
| Example 3 | 83 | Non-ignited |
| Example 4 | 83 | Non-ignited |
| Example 5 | 83 | Non-ignited |
| Example 6 | 85 | Non-ignited |
| Example 7 | 83 | Non-ignited |

TABLE 3-continued

| Section | Life-span (%) (500cycle) | Penetration safety |
| --- | --- | --- |
| Example 8 | 83 | Non-ignited |
| Example 9 | 83 | Non-ignited |
| Example 10 | 84 | Non-ignited |
| Example 11 | 83 | Non-ignited |
| Example 12 | 83 | Non-ignited |
| Example 13 | 82 | Non-ignited |
| Example 14 | 83 | Non-ignited |
| Example 15 | 83 | Non-ignited |
| Example 16 | 82 | Non-ignited |
| Example 17 | 80 | Non-ignited |
| Example 18 | 82 | Non-ignited |
| Example 19 | 81 | Non-ignited |
| Example 20 | 80 | Non-ignited |
| Example 21 | 73 | Non-ignited |
| Example 22 | 74 | Non-ignited |
| Example 23 | 73 | Non-ignited |
| Example 24 | 73 | Non-ignited |
| Example 25 | 83 | Non-ignited |
| Example 26 | 84 | Non-ignited |
| Comparative Example 1 | 70 | Ignited |
| Comparative Example 2 | 71 | Ignited |
| Comparative Example 3 | 72 | Ignited |
| Comparative Example 4 | 71 | Ignited |
| Comparative Example 5 | 71 | Non-ignited |
| Comparative Example 6 | 68 | Ignited |
| Comparative Example 7 | 69 | Ignited |
| Comparative Example 8 | 70 | Ignited |
| Comparative Example 9 | 70 | Non-ignited |
| Comparative Example 10 | 69 | Non-ignited |
| Comparative Example 11 | 65 | Ignited |
| Comparative Example 12 | 66 | Ignited |
| Comparative Example 13 | 67 | Non-ignited |
| Comparative Example 14 | 66 | Non-ignited |
| Comparative Example 15 | 66 | Non-ignited |
| Comparative Example 16 | 60 | Non-ignited |
| Comparative Example 17 | 61 | Non-ignited |
| Comparative Example 18 | 62 | Non-ignited |
| Comparative Example 19 | 62 | Non-ignited |
| Comparative Example 20 | 61 | Non-ignited |
| Comparative Example 21 | 55 | Non-ignited |
| Comparative Example 22 | 56 | Non-ignited |
| Comparative Example 23 | 57 | Non-ignited |
| Comparative Example 24 | 56 | Non-ignited |
| Comparative Example 25 | 56 | Non-ignited |
| Comparative Example 26 | 50 | Non-ignited |
| Comparative Example 27 | 51 | Non-ignited |
| Comparative Example 28 | 52 | Non-ignited |
| Comparative Example 29 | 51 | Non-ignited |
| Comparative Example 30 | 51 | Non-ignited |

Referring to the above Table 4, it can be seen that the batteries of the examples generally exhibit superior life-span property and penetration safety, compared to those of the comparative examples.

Specifically, comparing the examples with the comparative examples including the ceramic coating layers having the same thickness as each other, it can be seen that, when using the cathode active material according to the present invention, the batteries were not ignited during the evaluation of penetration from the case that the ceramic coating layer has a total thickness of 5 μm, but when using the cathode active material different from the present invention, the batteries were ignited during the evaluation of penetration, except for the case that the ceramic coating layer has a total thickness of 12 μm or more.

In addition, it can be seen that, when using the cathode active material having a uniform composition, as the thickness of the ceramic coating layer was increased, the life-span property was significantly reduced, but when using the cathode active material according to the present invention, even if the thickness of the ceramic coating layer was increased, excellent life-span property was exhibited without significantly affecting the same.

What is claimed is:

1. A lithium secondary battery, comprising a cathode electrode, an anode electrode, and a separation film installed between the cathode electrode and the anode electrode,
wherein the cathode electrode includes a cathode active material containing lithium-metal oxide of which at least one of metals has a continuous concentration gradient throughout the cathode active material from a center thereof to a surface thereof,
the anode electrode includes an anode active material layer and a first ceramic coating layer directly coated on at least one surface of the anode active material layer,
the separation film includes a base film, and a second ceramic coating layer directly coated on at least one surface of the base film, and
the first ceramic coating layer of the anode electrode and the second ceramic coating layer of the separation film face each other,
wherein the lithium-metal oxide is represented by Formula 1 below, $$Li_xM1_aM2_bM3_cO_y \qquad \text{[Formula 1]}$$

wherein M1 is Ni, and M2 and M3 are selected from a group consisting of Co, Mn, Na, Mg, Ca, Ti, V, Cr, Cu, Zn, Ge, Sr, Ag, Ba, Zr, Nb, Mo, Al, Ga and B, and $0<x\le1.1$, $2\le y\le2.02$, $0<a<1$, $0<b<1$, $0<c<1$, and $0<a+b+c\le1$,
wherein M1 has a concentration gradient in which a concentration decreases continuously from the center of the cathode active material to the surface of the cathode active material, and a of Formula 1 is 0.7497 or more throughout an entire region of the cathode active material.

2. The lithium secondary battery according to claim 1, wherein at least one of the metals included in the lithium-metal oxide has a constant concentration throughout the cathode active material from the center thereof to the surface thereof.

3. The lithium secondary battery according to claim 1, wherein M3 has a concentration gradient increasing continuously throughout the cathode active material from the center thereof to the surface thereof, and M2 has a constant concentration throughout the cathode active material from the center thereof to the surface thereof.

4. The lithium secondary battery according to claim 3, wherein the M1, M2 and M3 are Ni, Co and Mn, respectively.

5. The lithium secondary battery according to claim 3, wherein the M1 is Ni, and $0.7497 \leq a \leq 0.9$ and $0.05 \leq b+c \leq 0.4$.

6. The lithium secondary battery according to claim 3, wherein the M1 is Ni, and $0.7497 \leq a \leq 0.9$ and $0.1 \leq b+c \leq 0.3$.

7. The lithium secondary battery according to claim 1, wherein the first ceramic coating layer of the anode electrode includes ceramic powders having an average particle diameter of 0.01 to 2.0 μm.

8. The lithium secondary battery according to claim 1, wherein the first ceramic coating layer of the anode electrode includes the ceramic powders in an amount of 80 to 97% by weight to a total weight of the ceramic coating layer.

9. The lithium secondary battery according to claim 1, wherein the second ceramic coating layer of the separation film includes ceramic powders having an average particle diameter of 0.01 to 2.0 μm.

10. The lithium secondary battery according to claim 1, wherein the second ceramic coating layer of the separation film includes the ceramic powders in an amount of 80 to 97% by weight to a total weight of the ceramic coating layer.

11. The lithium secondary battery according to claim 1, wherein the first and second ceramic coating layers include each independently metal oxide containing at least one metal selected from a group consisting of aluminum (Al), titanium (Ti), zirconium (Zr), barium (Ba), magnesium (Mg), boron (B), yttrium (Y), zinc (Zn), calcium (Ca), nickel (Ni), silicon (Si), lead (Pb), strontium (Sr), tin (Sn) and cerium (Ce), as the ceramic powders.

12. The lithium secondary battery according to claim 1, wherein the first and second ceramic coating layers include each independently at least one selected from a group consisting of $Al_2O_3$, $TiO_2$, $ZrO_2$, $Y_2O_3$, ZnO, CaO, NiO, MgO, $SiO_2$, SiC, $Al(OH)_3$, AlO(OH), $BaTiO_3$, $PbTiO_3$, PZT, PLZT, PMN—PT, $HfO_2$, $SrTiO_3$, $SnO_3$ and $CeO_2$, as the ceramic powders.

13. The lithium secondary battery according to claim 1, wherein the first ceramic coating layer included on one surface of the anode electrode has a thickness of 1 to 10 μm.

14. The lithium secondary battery according to claim 1, wherein the second ceramic coating layer included on one surface of the separation film has a thickness of 1 to 10 μm.

15. The lithium secondary battery according to claim 1, wherein the first and second ceramic coating layers have a sum of total thickness of 5 to 30 μm.

16. The lithium secondary battery according to claim 1, wherein the second ceramic coating layer is formed on upper and lower faces of the base film.

17. The lithium secondary battery according to claim 1, wherein the first ceramic coating layer is formed on upper and lower faces of the anode electrode.

* * * * *